3,663,666
METHOD OF FORMING SILICONE RUBBER ARTICLES

Bird J. Vincent, Ingersoll Township, Midland County, Mich. (2775 Smith Crossing Road, Freeland, Mich. 48623)
No Drawing. Filed May 22, 1970, Ser. No. 39,916
Int. Cl. B01j 2/02
U.S. Cl. 264—13    4 Claims

ABSTRACT OF THE DISCLOSURE

A method of making powdered silicone rubber comprising the formation of a solvent dispersion by dispersing in a volatile solvent a silicone rubber stock together with any desired additives and a silica filler for the stock in an amount equal to at least 30 parts by weight per 100 parts stock and then spray drying the solvent dispersion. Silicone rubber articles are then formed from the powder by adding a curing agent to the powder, applying pressure and shear forces on a mill or in an extruder to cause massing of the powder and then shaping and curing the massed material.

BACKGROUND OF THE INVENTION

The present invention relates to the formation of silicone rubber in powdered form.

In many plastic molding and extrusion operations the feed material is a powder which can simply be fed into a hopper on the injection molding or extrusion equipment. Recently it has been suggested that certain types of rubbers may be processed in a similar manner. Various methods have been suggested for producing organic rubbers in a powdered or graunlar form for ease in handling. A problem exists, however, in that rubbers tend to be sticky prior to curing and the particles tend to agglommerate. An article in the October 1969 issue of Rubber World describes progress and background in the field of powdered rubber technology.

To date, silicone rubber has been handled in bulk form. That is, large bodies of the silicone rubber stock are processed on a rubber mill just prior to molding or extruding. This is a time consuming operation and also tends to shorten life of the material and generally detract from handling characteristics. To compensate for the breakdown of silica fillers in the silicone rubber, it has been conventional in the art to add large amounts of plasticizers to the rubber stocks prior to milling in order to improve handling characteristics. The plasticizers, however, tend to detract from the properties of the cured rubber article. Milling of the rubber stock, of course, requires time and necessitates the expense of manufacture of the mill itself.

SUMMARY OF THE INVENTION

It is accordingly an object of the present invention to provide a method of forming silicone rubber articles using a powdered silicone rubber by use of molding or extruding operations. A further object is the provision of a method of manufacturing silicone rubber whereby the amount of plasticizer needed in the rubber is minimized.

In accordance with these and other objects, there is provided by the present invention a method which consists essentially of forming a solvent dispersion in a volatile solvent of diorganopolysiloxane gum having a Williams plasticity of at least 0.050 inch and having a unit formula $R_2SiO$ in which R is a monovalent radical selected from the group consisting of hydrocarbon radicals and halogenated hydrocarbon radicals, said units being bonded together by silicon-oxygen-silicon bonds and a silica filler for the gum in an amount equal to at least 30 parts by weight of silica per 100 parts gum, and then drying the solvent dispersion without shear, such as in a spray drier. During the spray drying operations the solvent is volatilized and recovered leaving the gum and filler in a powdered form suitable for feeding directly into an extruder hopper, for example. It has been found that the amount of plasticizer needed in such powdered silicone rubbers is less than that needed in conventional silicone rubbers to obtain similar handling characteristics.

Various additives which are conventional in the production of silicone rubbers can be added to the solvent dispersion without detracting from the operability of the present invention. The process eliminates the need for extended milling of the silicone rubber prior to extruding or milling operations and thereby introduce economies into the manufacture of silicone rubber parts. The powdered material produced has a shelf life equal to the best silicone rubber stocks presently available. Other objects and attendant advantages of the invention will become better understood by those skilled in the art from a consideration of the following detailed description.

DESCRIPTION OF THE PREFERRED EMBODIMENTS

Numerous silicone rubber stocks are known to those skilled in the art. For purposes of the present invention, a diorganopolysiloxane gum having a Williams plasticity of at least 0.050 inch and having a unit formula $R_2SiO$, in which R is a monovalent radical selected from the group consisting of hydrocarbon radicals and halogenated hydrocarbon radicals, said units being bonded together by silicon-oxygen-silicon bonds is suitable as a base polymer. The most common of these is based on dimethylpolysiloxane.

It is known that these materials can be cured into rubber bodies by the addition of certain well known catalysts. It is a common practice to add filler material such as silica to give strength to the rubbers produced. The silica fillers can be introduced untreated into the stock or can be treated to make them hydrophobic. Treated fillers are well known in the art and include treatment with chlorosilanes such as triorganochlorosilanes and diorganodichlorosilane, diorganocyclosiloxanes, hexaorganodisiloxane, organosilazanes and the like. The suitable fillers include for example, fume silica, silica aerogel, silica xerogel, silica soot, quartz and other forms.

It is also well known that the silicone rubber stocks can contain other ingredients such as pigments to impart color, compression set additives, plasticizers, heat stability additives, and the like. It is to be understood that the gums used in the present invention can include any of these conventional additives. In accordance with the present invention, the first necessary step is to form a solvent dispersion of the base polymer, together with at least 30 parts by weight of silica per 100 parts gum (base polymer). Any desired additives as discussed above can be introduced into the solvent dispersion. The solvent used to form the dispersion can be any volatile solvent known for silicone rubber stocks. These include, for example, perchloroethylene, Chlorothene, heptane, hexane, toluene, xylene, cyclic siloxanes and others. Those solvents exhibiting volatility and general inflammability are preferred for purposes of economy and safety.

The solvent dispersion, after being formed, is then heated and passed through a drier capable of devolatilizing the dispersion with a minimum of shear. Spray drying is a preferred method of accomplishing this. While the heating step is not absolutely essential, it speeds the drying operation and assures virtually complete removal of the solvent from the solids as they leave the spray drier nozzle. Spray drying equipment is well known and need not be described in detail in this application. Any conventional spray drier will function. It is preferred, however, that the spray drying take place in vacuum so that the solvent can be easily recovered for reuse. This results in economy for the system. Recovery units for recovering solvents are also well known in the chemical engineering field and will not be described in detail in this application. As the solvent dispersion is passed through the spray drier nozzle, the volatile solvent is removed leaving a powder which consists of substantially all the solids which were contained in the solvent dispersion. In a unit which was built and tested the particle size of the powder ranged between 80 and 100 microns in diameter.

The powder can be stored in bags and drums and has been stored for eighteen months without degradation. When it is ready for use the powder along with the desired catalyst can be fed, for example, into a hopper feeding an extruder screw. It has been found that there is sufficient mixing in the screw to disperse the catalyst through the powder sufficiently for good curing. The extruder screw applies sufficient pressure and shear forces to the catalyst-powder mixture to cause the powder to mass and the output through the shaping die of the extruder provides an article ready for curing, for example, by application of heat.

If desired, the powder when ready for use, can be mixed with a catalyst on a conventional rubber mill to cause the material to mass for molding operations, for example. Again, pressure is required to cause massing of the powder. Other means of mixing the catalyst with the powder prior to use can also be used.

The powder formed is dry and non-tacky. It is to be noted that no particulate matter needs to be added to the powder as mentioned in the aforementioned article in Rubber World, referring to spray dried rubber latexes.

It has been found that the amount of plasticizer required for equivalent handling is less with the powdered material than it is with conventional rubber stocks. This is apparently because of the lack of need for high-shear handling of the powdered material. In the case of treated silica fillers in conventional rubber stocks placed on a rubber mill, the high shear inherent in the milling operation tends to fracture the silica particles, causing untreated surfaces to come in contact with the rubber, thus necessitating additional plasticizer for improved handling characteristics. It is known to those skilled in the art that plasticizer content should be kept to a minimum if one is to obtain a cured rubber with good physical properties. However, without plasticizer many materials become impossible to shape. As noted, the reduction in plasticizer required when the present invention is used alleviates this problem conventional in the silicone rubber art, since no milling is required. Additionally, the free flowing nature of the powder provides ideal handling characteristics prior to extrusion or molding operations. The following examples are illustrative of the invention and should not be construed as limiting the present invention which is properly delineated in the claims.

Example 1

A mixture of 100 parts by weight of a diorganopolysiloxane gum having 99.835 mol percent dimethylsiloxane units and 0.165 methylvinylsiloxane units, endblocked with dimethylvinylsiloxane units and having a plasticity of 0.06 inch, together with 7 parts by weight of a plasticizer consisting of hydroxyl endblocked polydimethylsiloxane fluid having a viscosity of 2 cs. at 25° C., together with 40 parts by weight of reinforcing silica filler having surface area of about 200 sq. meters per gram, was added to chlorothene (a chlorohydrocarbon solvent containing methyl chloroform), to make 10% solids in a dispersion. The resulting dispersion was heated to 165° C. and passed through the nozzle of a vacuum spray drier operating an absolute pressure of 25 inches of mercury. A white powder containing 99.8% solids was removed from the bottom of the spray drier.

The powder was mixed with 2 parts by weight per 100 parts powder, of 2,4-dichlorobenzoylperoxide in a rotary drier and then fed into an extruder. The material was extruded on No. 18 AWG wire to a depth of 110 mils and passed through a conventional hot air vulcanizer. The extrusion was smooth and the insulated properties of the wire were comparable to conventional silicone rubbers.

Example 2

When the filler content of the mixture of Example 1 is varied between 30 and 70 parts by weight of the gum, similar results to those of Example 1 are obtained.

Example 3

The powder formed in Example 1, together with 2 parts by weight, per 100 parts powder, of 2,4-dichlorobenzoylperoxide was placed on a two roll rubber mill and milled for ten minutes to achieve mixing. The resultant material mass was then sheeted and cured in a hot air vulcanizer. The sheet was found to have physical properties similar to properties of sheets made of a similar formulation made in the conventional manner.

That which is claimed is:

1. A method of forming silicone rubber articles consisting essentially of forming a solvent dispersion by dispersing in a volatile solvent a diorganopolysiloxane gum having a Williams plasticity of at least 0.050 inch and having a unit formula $R_2SiO$ in which R is a monovalent radical selected from the group consisting of hydrocarbon radicals and halogenated hydrocarbon radicals, said units being bonded together by silicon-oxygen-silicon bonds, and a silica filler for said gum in amount equal to at least 30 parts by weight of silica to 100 parts gum, then spray drying the solvent dispersion leaving the gum and filler in powder form, storing the powder until needed and then, mixing a catalyst with said powder, massing the mixture of curing agent and powder by applying pressure and shear forces to the mixture, shaping the resulting mass to the desired article shape, and applying heat to the shaped, massed, mixture to effect curing thereof.

2. A method as defined in claim 1 wherein said shaping is accomplished by molding the massed mixture.

3. A method as defined in claim 1 wherein said shaping is accomplished by passing the massed mixture through an extrusion die.

4. A method as defined in claim 1, wherein said massing and shaping are both effected by feeding the powder and catalyst into an extruder and forcing the material through a shaping die at the extruder output.

References Cited

UNITED STATES PATENTS

| | | | |
|---|---|---|---|
| 2,603,837 | 7/1952 | Lecuir | 264—109 |
| 3,061,578 | 10/1962 | Nitzsche | 260—37 SI |
| 3,267,187 | 8/1966 | Slosberg et al. | 264—122 |

ROBERT F. WHITE, Primary Examiner

J. R. HALL, Assistant Examiner

U.S. Cl. X.R.

264—122